March 1, 1960 J. R. PLATE ET AL 2,926,734
CLUTCH RELEASE MECHANISM
Filed May 2, 1958 2 Sheets-Sheet 1
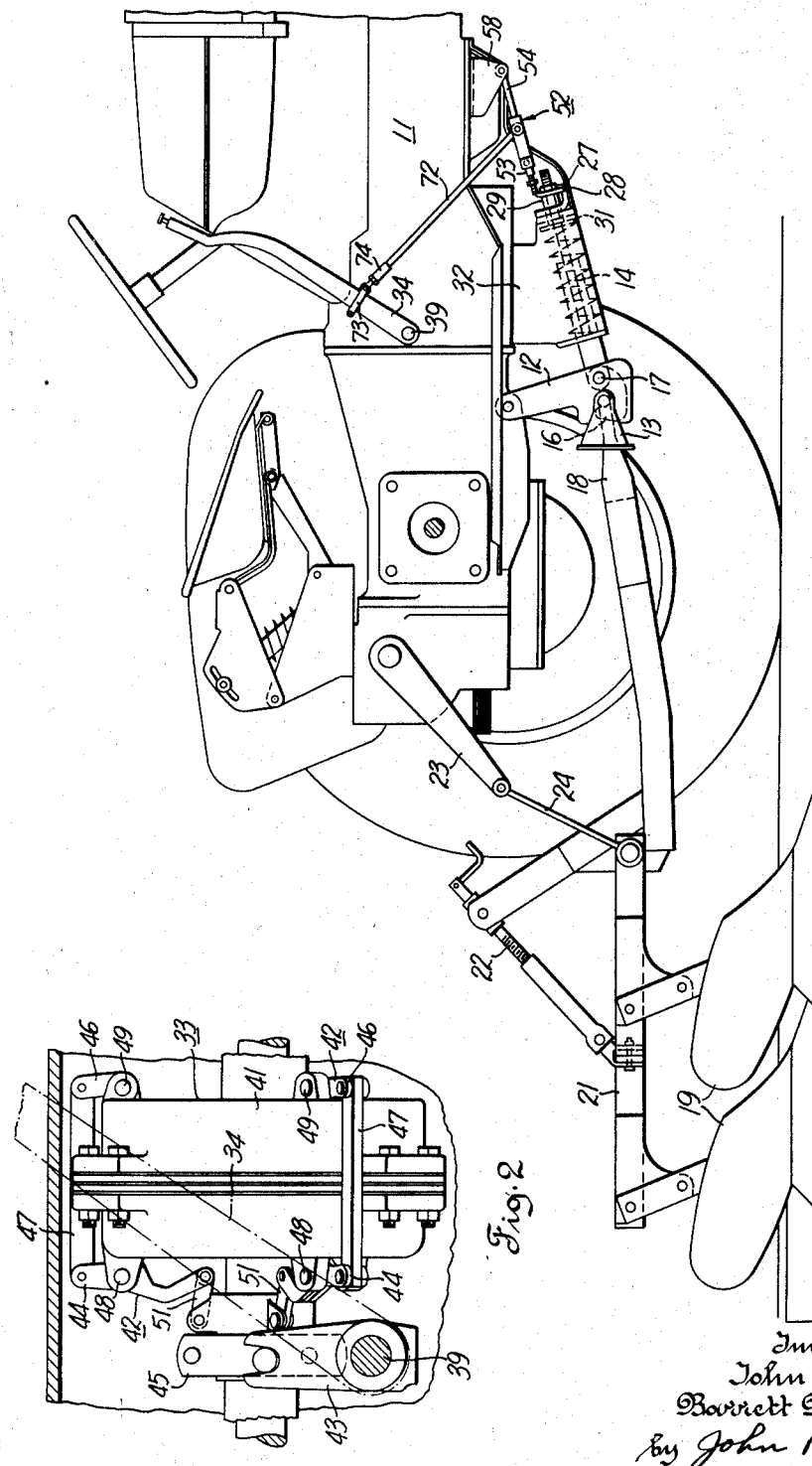
Inventors
John R. Plate
Barrett N. Alexander
by John P. Hines
Attorney

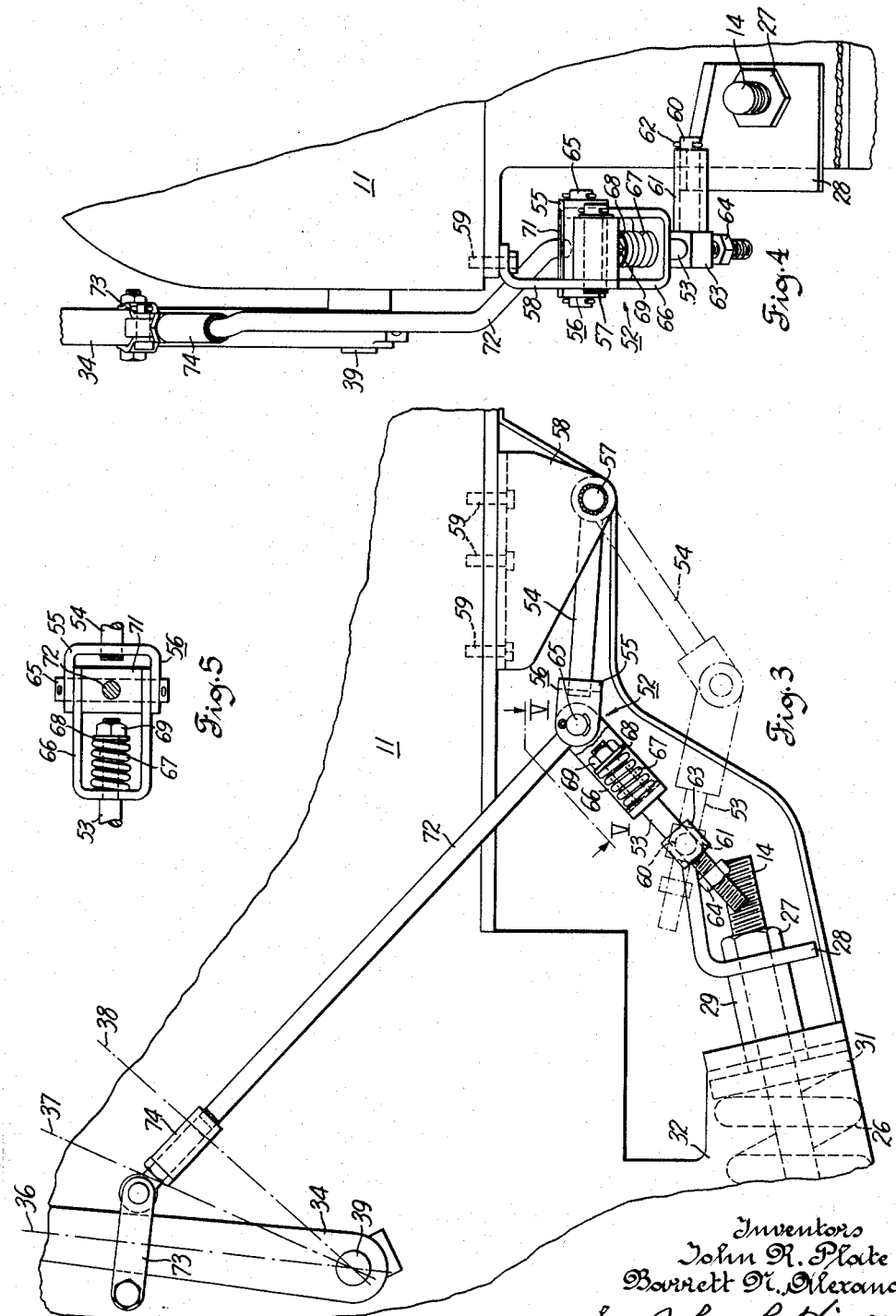

2,926,734
Patented Mar. 1, 1960

2,926,734
CLUTCH RELEASE MECHANISM

John R. Plate, Milwaukee, and Barrett N. Alexander, Hartland, Wis., assignors to Allis-Chalmers Manufacturing Company, Milwaukee, Wis.

Application May 2, 1958, Serial No. 732,695

7 Claims. (Cl. 180—14.5)

This invention concerns clutch release mechanisms for vehicles and more particularly an automatic clutch release for farm tractors wherein an increased pull on the tractor draft transmitting element results in moving a clutch control lever to a disengaged position.

When a propelled implement such as a moldboard plow strikes a large object such as a stone or stump, the implement may be damaged. It is the combined force of the tractive effort and the impact force due to the kinetic energy of the tractor that is likely to damage the plow. A cushion hitch overcomes much of the force due to kinetic energy, however, the hitch alone is in many cases insufficient to adequately protect the plow. If the tractive effort of the tractor can be stopped as soon as possible after the object has been struck, the possibility of damage to the implement is lessened considerably. This stopping of the tractive effort can be accomplished by providing a connection between the draft transmitting element and the engine clutch wherein the clutch is disengaged when the draft element or drawbar is moved a predetermined amount relative to the tractor. Since many tractors are provided with a spring biased drawbar which is allowed a limited amount of displacement relative to the tractor this displacement can be used to cause the engine clutch to be moved to the disengaged position when the plow strikes a large object.

One disadvantage of connecting a clutch release to an engine clutch resides in the fact that the engine clutch is spring biased to an engaged position. When a tractor propelled plow strikes a large object, the tractor moves forward relative to the plow compressing the drawbar spring. This relative movement causes the clutch release mechanism to disengage the engine clutch. However, the drawbar spring is a high rate spring and after the tractor has been brought to a halt, it is quite possible that this spring exerts sufficient force to move the tractor rearward. This allows the clutch release mechanism to move out of engagement with the engine clutch and because it is spring biased the clutch will automatically move to the engaged position. The tractor again moves forward reestablishing an undesirable stress in the implement. To overcome this undesirable feature some clutch release mechanisms have been provided with a latch which holds the clutch in a disengaged position. The latch adds to the cost and complexity of the release mechanism. It requires the operator to disengage the latch when he wishes to engage the clutch. Furthermore, the latch must be so designed that it is not engaged when the engine clutch is actuated by the tractor operator.

In recent years many tractors have been provided with an auxiliary clutch which will remain in the disengaged position without employing a latch. In some cases, however, this auxiliary clutch is of the type which can be shifted into two oppositely disposed engaged positions from a disengaged position allowing a quick change of tractor speed. When an auxiliary clutch having two oppositely disposed driving positions is employed to interrupt power to the drive wheels the clutch must be moved in two directions to the disengaged position by movement of the drawbar in one direction. To satisfy this condition applicants have developed a novel clutch release mechanism which transposes a pull on the tractor drawbar into a push or a pull on the auxiliary clutch mechanism depending upon the position in which the clutch lever has been placed by the tractor operator.

It is therefore a general object of the invention to provide a tractor with a clutch release mechanism for automatically moving a clutch control lever in either of two converging directions to a disengaged position as a result of movement in one direction by the tractor draft transmitting element relative to the tractor.

A further object of the invention is to provide a clutch release mechanism of the hereinbefore described type with a toggle whereby pull on one link of the toggle results in movement in either of two directions in a member connected to the toggle.

Another object of the invention is to provide a tractor with a clutch release mechanism including a toggle operatively connected to a clutch control lever and the tractor draft transmitting element wherein the toggle is moved into either of two broken positions or a straight line position by movement of the clutch control lever into either of two engaged positions or a disengaged position respectively, and the clutch control lever is moved into the disengaged position from either of the two engaged positions by movement of the draft transmitting element relative to the tractor a predetermined amount.

A further object of the invention is to provide a clutch release mechanism of the hereinbefore described type with lost motion means wherein there is a preselected amount of lost motion of the draft transmitting element before a force is transmitted to the clutch control lever.

Another object of the invention is to provide a clutch release mechanism of the hereinbefore described type with means for adjusting the amount of lost motion of the draft transmitting element before a force is transmitted to the clutch control lever.

A further object of the invention is to provide a clutch release mechanism with a toggle operatively connected between the tractor draft transmitting element and the clutch control lever wherein a force cannot be transmitted from the clutch control lever to the draft transmitting element.

Another object of the invention is to provide a clutch release mechanism of the hereinbefore described type with a spring biased means for allowing relative movement between the drawbar element and the toggle in the draft transmitting direction after the toggle is in the straight line position.

The foregoing and other objects and advantages of the invention will become more fully apparent from the following description of the invention shown in the accompanying drawings.

Referring to the drawings, in which like reference characters designate the same or similar parts of the various views;

Fig. 1 is a side elevation of a rear portion of a tractor and plow combination showing the invention in the straight line or clutch disengaged position;

Fig. 2 is a side elevation showing in detail the clutch actuating mechanism;

Fig. 3 is an enlarged view of the invention as shown in Fig. 1 with the low range driving position of the clutch control lever and the corresponding broken position of the toggle in solid lines, the other positions of the clutch control lever being indicated by the control lever center lines and the other toggle broken position shown in phantom lines;

Fig. 4 is a rear view of Fig. 3 showing only the full line position; and

Fig. 5 is a view taken along the lines V—V in Fig. 3.

Referring to Fig. 1, a farm tractor generally designated 11 has the right traction wheel removed to more clearly show the invention. Pivotally connected to the underside of the tractor frame and depending therefrom is an implement hitch lever 12. The lower end of hitch lever 12 has a rearwardly opening bell housing 13 rigidly connected thereto in any conventional manner such as by welding. A drawbar or draft transmitting element 14 has a hook 16 pivotally connected to one end thereof through a pin 17 which is journaled in the free end of the hitch lever 12. The hook extends into the bell housing 13 and is positioned to receive the eye of an implement tongue 18 providing a draft transmitting connection between the tractor 11 and an implement 19. The implement or moldboard plow 19 is provided with a plow beam 21 which is operatively connected through an adjustable pivot to the tongue 18. The beaming screw 22 is provided to vary the angle between the plow beam 21 and tongue 18 to preselect the depth at which the plow bottoms will level out relative to the ground surface. The tractor hydraulic lift arms 23 are connected to the plow beam through the lift links 24 and provide hydraulic control for lifting and lowering the plow.

Referring to Fig. 3, the drawbar or draft transmitting element 14 extends through a high rate spiral compression spring 26. The forward end of the drawbar element is threaded to receive a retaining nut 27. The retaining nut 27 is turned down tight against a mounting plate 28 which is in abutting relation with one end of a spacer sleeve 29. The sleeve 29 encircles the drawbar element 14 and has its other end abutting against a spring retainer disk 31 which has a hole therethrough allowing it to pass over the draft transmitting element 14. The spring 26 and retainer disk 31 are contained in a housing 32 which is rigidly attached to the tractor frame and depends therefrom in longitudinally spaced transversely aligned relation to the hitch lever 12. The forward end of this housing has an opening therein through which passes the sleeve 29. The control spring 26 is held in a preloaded condition having one end engaged with spring retainer 31, which bears against the inside of the forward end of housing 32, and its other end engaged with a flat surface formed on the inside of the rearward end of housing 32 as shown in Fig. 1. Because of the rate of the spring 26 and the magnitude of the preload force a considerable force is required on the draft transmitting element 14 before any displacement of the element is possible. This spring 26 is of a sufficient rate to move the tractor rearward after an obstacle has been encountered by the plow and the spring has been compressed due to additional forward movement of the tractor relative to the plow.

The tractor is provided with the usual engine clutch and is additionally provided with an auxiliary clutch generally designated 33 and shown in Fig. 2. The clutch is actuated by a clutch control lever 34 which is positioned adjacent to the operator's station. The clutch control lever has three positions shown by the lever's center line in Fig. 3; a low range driving position 36, a neutral or nondriving position 37 and a high range driving position 38.

The clutch control lever 34 is pivoted on a rock shaft 39 which extends into the clutch housing and actuates the clutch actuating mechanism. Referring to Fig. 2, friction drive members are operatively contained within the clutch drum 41. The clutch actuating mechanism generally designated 42 is composed of three parts equally spaced around the clutch drum 41 and is actuated by a sliding collar 45. This collar is shifted forward or rearward by a yoke 43 which is integral with the rock shaft 39. Each part of the clutch actuating mechanism is composed of a pair of engaging links 44 and 46 and a link 47 which connects the engaging links 44 and 46 above their respective pivots 48 and 49. An extension of the engaging link 44 remote from the pivot connection with the connecting link 47 is connected to the collar 45 by a short pivot link 51.

As viewed in Fig. 2, rotation of the rock shaft 39 in a counterclockwise direction causes the collar 45 to slide to the left pivoting the left hand engaging link 44 clockwise into a disengaged position while at the same time the connecting link 47 causes the other engaging link 46 to pivot clockwise into an engaged position. By rotating the rock shaft 39 in a clockwise direction, the collar 45 is moved to the right pivoting the engaging link 44 counterclockwise into an engaged position while at the same time the connecting link 47 pivots the engaging link 46 counterclockwise into a disengaged position. Equally spaced between the two above described engaged positions is a neutral or disengaged position shown by the position of the control lever 34 in Fig. 1 and the control lever center line 37 in Fig. 3.

Referring to Figs. 3 and 4, the mounting plate 28 is generally L-shaped in cross section and is displaceable with the draft transmitting element 14 relative to the tractor 11. A toggle or release means generally designated 52 is operatively positioned between the mounting plate and the tractor frame. The toggle is composed of a first link 53 and a second link 54 and an attaching means 56 which pivotally connects the relatively adjacent ends of the first and second links. The relatively remote ends of the first and second or the pair of links 53 and 54 are connected respectively to the mounting plate 28 and the frame of the tractor 11. The remote end of second link 54 is pivoted on a pin 57 which is journaled in a bracket 58. The bracket 58 is preferably rigidly attached to the tractor frame by means of mounting screws 59.

The remote end of first link 53 is adjustably connected to the mounting plate 28. A cylindrical sleeve 61 is preferably welded to the mounting plate 28 and extends therefrom at substantially a right angle from the draft transmitting element 14. A pin 60 is rotatably contained within the cylindrical sleeve 61 and is held against lineal movement to the left, as viewed in Fig. 4, relative to the sleeve by a cotter key 62. Rigidly attached to the pin in any conventional manner for rotation therewith is a block 63. This block holds the pin from lineal movement to the right, as viewed in Fig. 4, relative to the sleeve 61. The first link 53 extends through an opening in the block and is free to slide through the opening relative to the block and pivot with the block relative to the sleeve 61. The remote end portion of the first link 53 has a thread formed thereon on which is contained a stop nut 64. When the drawbar element 14 is moved in the draft transmitting direction, that is to the left, as viewed in Fig. 3, the block slides over the first link 53 until it contacts the stop nut 64. This stop nut can be adjusted on the threaded portion to vary the limit of relative movement between the first link and the block in the draft transmitting direction. The first link 53 is free to move relative to the block in the direction opposite to the draft transmitting direction.

The relatively adjacent end, the right hand end as viewed in Fig. 3, of the first link 53 passes through an opening in the base of a yoke 66 and terminates in a threaded portion. A resilient means or compression spiral spring 67 is positioned around the adjacent end of the first link 53 and is held in place by a washer 68 which is held against one end of the coil spring by a nut 69. The opposite end of the coil spring abuts against the base of the yoke 66. With this connection, force is transmitted from the link 53 through the coil spring 67 to the yoke 66.

As shown in the preferred embodiment the attaching means 56 for the relatively adjacent ends of the first and second links 53 and 54, respectively, consist of the yoke 55, the yoke 66 and the pin 65 which passes through alignable openings in each yoke and upon which each yoke is pivoted. A spacer sleeve 71 having an axially extending opening therethrough is rotatably contained on the pin 65 between the arms of the yoke 66. The sleeve is allowed to pivot relative to the pin 65 and the yokes 55 and 66. Rigidly attached to the spacer sleeve 71 in any conventional manner is a push pull member, connecting means or rod 72. The opposite end of this rod 72 is connected in any conventional manner as by the bracket 73 to the clutch control lever 34. In the preferred embodiment an adjusting connection 74 is provided in the rod 72 so that it can be adjusted in length.

In operation of a clutch release mechanism, it is desirable to have quick response in releasing the clutch when an obstacle too heavy to move is encountered. However, it is undesirable to have the clutch release mechanism release the clutch on contacting an obstacle which will be removed without damage to the propelled implement. It is therefore necessary to allow some movement of the draft transmitting element without actuating the clutch mechanism. This relative movement or lost motion is provided in applicants' invention by the connection between the mounting plate 28 and the first link 53. As shown in Fig. 3, the distance between the holding nut 64 and the block 63 results in lost motion or relative motion of the draft transmitting element 14 relative to the toggle until the block contacts the nut. This amount of lost or relative motion can be adjusted by merely turning the holding nut toward or away from the block 63.

It is necessary in order to protect the toggle from damage that the displacement of the draft transmitting element 14 is complete when the toggle has moved to the straight line position. If the draft transmitting element is moved relative to the tractor after the toggle is in a straight line position the remote end of the second link 54 could be pulled from the mounting bracket 58. Applicants have anticipated such a happening and have provided the toggle with a safety feature to guard against this occurrence with the inclusion of the compression spring 67. This spring offers sufficient resistance to compression so that a pull on the first link 53 results in pivoting the second link 54 about its pivot connection to the mounting bracket 58 until the toggle has been positioned in a straight line. However, if additional movement of the draft transmitting element should take place, the entire force which would be associated with this movement is not transmitted to the mounting connection at the remote end of the second link but is limited by the compressive force in spring 67.

As was previously pointed out, the first link 53 is free to move through the opening in the block 63 in a generally left hand direction, as shown in Fig. 3. This is necessary so that the toggle can be positioned in either broken position by the clutch control lever 34. As shown in Fig. 3, if the clutch control lever is moved forward to the high range position shown by the center line 38, the toggle must be moved from the solid line position to the phantom line position. In passing from the solid line position through the straight line position, the first link 53 will move to the left relative to the block 63 and back to the right as the toggle is moved to the phantom line position.

To describe the operation of applicants' invention it can be assumed that the plow shown in Fig. 1 is in the ground and the tractor is propelling the plow while the clutch lever 34 is in the position shown in Fig. 3 and the toggle is in the broken position shown in solid lines. If an obstacle is encountered, the relative movement between the tractor and the implement causes the draft transmitting element 14 to deflect to the left as shown in Fig. 3 until the block 63 contacts the stop nut 64. Further rearward movement of the draft transmitting element causes the first link 53 to be pulled to the left resulting in a pivoting movement of the second link 54 around its connection to the bracket 58. The attaching means 52 is moved downward until the three pivot points of the toggle approach a straight line position. Downward movement of the attaching means results in the clutch control lever 34 being pulled forward to a neutral position by the push pull rod 72.

After the toggle is in a straight line position should the force on the implement be lessened or should the tractor be pulled rearward by the force of the draft regulating spring, the clutch will not be moved to a driving position because the block 63 is free to move to the right relative to the first link 53 with the mounting plate 28. After the obstacle has been removed, the operator can move the clutch control lever to either range. Assuming the clutch control lever is moved to the high range as shown by the center line 38 in Fig. 3, the toggle will assume the position shown in phantom lines in Fig. 3 and the mechanism is again ready to release the clutch should the plow strike an immovable object. A pull on the draft transmitting element would result in a pull on the first link 53 when the block 63 contacts the stop nut 64. Further displacement of the draft transmitting element after it has contacted the stop nut results in the toggle approaching the straight line position. This causes the attaching means 52 to be pushed upward from its broken position to a straight line position pushing the clutch control lever back to the neutral position hence stopping the tractive effort of the tractor. With this arrangement applicants have devised a new and novel structure for disengaging a clutch to interrupt tractive effort of a tractor by transposing a pull on the draft transmitting element into a push or pull on the clutch control lever.

It will be apparent to those skilled in the art that various changes and modifications may be made in the embodiment of the invention illustrated and described herein without departing from the spirit of the invention or from the scope of the appended claims.

What is claimed is:

1. Mechanism for automatically disengaging a clutch of a vehicle having a resilient draft transmitting element for connection to a vehicle propelled implement, comprising: a clutch control lever operatively connected to said clutch having a clutch disengaged position and two oppositely disposed clutch engaged positions; a toggle including a pair of links having their relatively remote ends pivotally connected to said draft transmitting element and said vehicle and attaching means pivotally connecting the relatively adjacent ends of said links, said toggle being movable in opposite directions from two broken positions to a straight line position upon movement of said draft transmitting element in one direction a predetermined amount; and a push pull member having one end pivotally connected to said toggle between said remote ends and its other end pivotally connected to said control lever, said control lever being in a clutch engaged position when said toggle is in a broken position and in a clutch disengaged position when said toggle is in a straight line position.

2. The mechanism set forth in claim 1 and further comprising: lost motion means operatively associated with said toggle for allowing movement in said one direction of said draft transmitting element relative to said clutch control lever a predetermined amount.

3. The mechanism set forth in claim 2 in which said lost motion means is adjustable to vary the amount of relative movement in said one direction between said draft transmitting element and said clutch control lever.

4. The mechanism set forth in claim 2 wherein said lost motion means allows movement, in a direction opposite to said one direction, of said draft transmitting element relative to said toggle.

5. Mechanism for automatically disengaging a clutch of a vehicle having a resilient draft transmitting element for connection to a vehicle propelled implement, comprising: a clutch control lever operatively connected to said clutch having a clutch disengaged position and two clutch engaged positions; a toggle including a pair of links having their relatively remote ends pivotally connected to said draft transmitting element and said vehicle and attaching means pivotally connecting the relatively adjacent ends of said links, said toggle being movable in opposite directions from two broken positions to a straight line position upon movement of said draft transmitting element in one direction a predetermined amount; resilient means operatively associated with said toggle for allowing relative movement between said draft transmitting element and the connection between the remote end of one of said pairs of links and said vehicle after said toggle is in the straight line position; and a push pull member having one end pivotally connected to said toggle between said remote ends and its other end pivotally connected to said control lever, said control lever being in a clutch engaged position when said toggle is in a broken position and in a clutch disengaged position when said toggle is in a straight line position.

6. Mechanism for automatically disengaging a clutch of a vehicle having a resilient draft transmitting element for connection to a vehicle propelled implement, comprising: a clutch control lever operatively connected to said clutch having a clutch disengaged position and two oppositely disposed clutch engaged positions; a release means including a pair of links having their relatively remote ends pivotally connected to said draft transmitting element and said vehicle and attaching means pivotally connecting the relatively adjacent ends of said links, said release means being movable in opposite directions from two broken positions to a straight line position upon movement of said draft transmitting element in one direction a predetermined amount; a push pull member having one end pivotally connected to said release means between said remote ends and its other end pivotally connected to said control lever, said control lever being in a clutch engaged position when said release means is in a broken position and in a clutch disengaged position when said release means is in a straight line position.

7. Mechanism for automatically disengaging a clutch of a vehicle having a resilient draft transmitting element for connection to a vehicle propelled implement, comprising: a clutch control lever connected to said clutch and having a clutch engaged and a clutch disengaged position; a toggle including first and second links having their relatively remote ends pivotally connected, respectively, to said draft transmitting element and said vehicle; attaching means pivotally connecting the relatively adjacent ends of said links, said toggle being in a clutch disengaged position when said first and second links are in a straight line position and in a clutch engaged position when said first and second links are in a broken line position; and connecting means having one end connected to said toggle between said remote ends and its other end connected to said clutch control lever, said clutch control lever being movable to position said toggle in said broken line position and said draft transmitting element being movable to position said toggle in said straight line position.

References Cited in the file of this patent

UNITED STATES PATENTS

| 1,220,982 | Hamilton | Mar. 27, 1917 |
| 1,322,661 | Wagner | Nov. 25, 1919 |
| 1,575,773 | Lambert | Mar. 9, 1926 |
| 2,294,188 | Kuntz | Aug. 25, 1942 |
| 2,725,110 | Weigel | Nov. 29, 1955 |